July 18, 1939.  E. H. L. JOHANNES  2,166,528
CAN-FILLING MACHINE
Filed Feb. 17, 1938  2 Sheets-Sheet 1

WITNESS
F. J. Hartman.

INVENTOR
Erich H. L. Johannes,
BY John D. Myers
ATTORNEY

July 18, 1939.  E. H. L. JOHANNES  2,166,528
CAN-FILLING MACHINE
Filed Feb. 17, 1938  2 Sheets-Sheet 2

INVENTOR
Erich H. L. Johannes.
BY John D. Myers
ATTORNEY

WITNESS
F. J. Hartman.

Patented July 18, 1939

2,166,528

UNITED STATES PATENT OFFICE 2,166,528

CAN-FILLING MACHINE

Erich H. L. Johannes, Audubon, N. J., assignor to Campbell Soup Company, a corporation of New Jersey Application February 17, 1938, Serial No. 190,909

12 Claims. (Cl. 226—108)

The invention relates to can filling machines and involves an improvement in filling valves which are employed for introducing a variable, measured quantity of syrup or other liquid into the cans, particularly after the solid ingredients of the canned material have been placed therein. Such machines and valves are commonly referred to as syruping machines and syruping valves.

The principal objects of the present improvement are the provision, in a can filling machine, of a differential measuring valve for introducing a variable quantity of syrup, sauce, or other liquid into the different cans in process of being filled; the provision of means for introducing into cans, which have theretofore been partially filled with other ingredients usually of a solid or semi-solid character, a quantity of such liquid sufficient to completely fill each can without overfilling or waste of the liquid; and the provision of means for differentially filling the cans so that each can is filled to the desired extent notwithstanding slight variations in the volume of the ingredients therefore placed in the different cans.

The invention is especially advantageous as a syruping valve in that it enables the operator of a machine equipped therewith to detect quickly and easily the absence of one or more of the solid or semi-solid ingredients from the cans by a visual inspection of the level of the contents thereof after the filling operation. This object is attained by so designing the entire apparatus that the operating capacity of the measuring chamber is sufficient to fill each of the cans to the required level after the other ingredients have been placed therein. The capacity of the measuring chamber is therefore considerably less than the total capacity of the can which is used with the machine. Consequently the presence of the solid ingredients in the can, or the absence of one or more of such ingredients therefrom, may be detected by a mere visual examination of the level of the contents of the can after the completion of the filling operation.

Another important object of the improvement is the provision, in a can filling machine, of a differential filling valve which is so constructed as to introduce the desired quantity of liquid into the different cans notwithstanding limited variations in level of the liquid in the filling tank with which the valve is used.

Another object of the present improvement is the elimination of the metal-to-metal feature of the valve elements of such a measuring device. This is accomplished by utilizing a resilient material, such as rubber or the like, for one of the elements of the valve per se, and by utilizing metal for the co-operating valve element. I have disclosed my improvement herein in connection with an annular, double seat valve, in which the movable valve element is made of a rubber ring and the fixed valve seats are made of metal.

Another object of the invention is the elimination of numerous parts from the measuring valves heretofore known. This object is accomplished by so constructing the measuring valve that a single port is utilized for communicating with the interior of the measuring chamber, and for serving as an inlet to this chamber from the filling tank as well as an outlet from the chamber to the cans in process of being filled. This object is further attained by providing two opposing valve seats for this port and employing a movable valve element which co-operates with one seat to permit communication between the filling tank and the interior of the measuring chamber and to cut off communication with the cans, and cooperates with the other seat to prevent communication between the filling tank and the interior of the measuring chamber and to provide communication between the measuring chamber and the cans in process of being filled.

A further object of the invention is the provision of a measuring valve which is easily and positively actuated by engagement of the cans therewith during the filling operation. This is accomplished by the employment of a single movable valve element which is preferably made of flexible material and is normally held in co-operative relation with one valve seat to permit the syrup or other liquid which is being used to flow freely from the filling tank into the measuring chamber and to prevent it from flowing into the cans, and is movable under the influence of a can into cooperative relation with another valve seat to prevent the flow of syrup from the filling tank into the measuring chamber and to permit the contents of the measuring chamber to escape into the cans.

A still further object of the invention is the provision of a measuring valve which may be easily and quickly assembled for use, and easily and quickly taken apart for cleaning after a period of use, or for replacement of parts. Another object of the invention is the provision of improved means for adjusting the capacity of the measuring chamber. The invention also has for one one of its objects the provision of improved means for retaining such measuring valve units in co-operative relation with the discharge openings in the filling tank.

Still other objects and advantages of the invention will be apparent from the following description, taken with the accompanying drawings wherein.

Figures 1, 2:
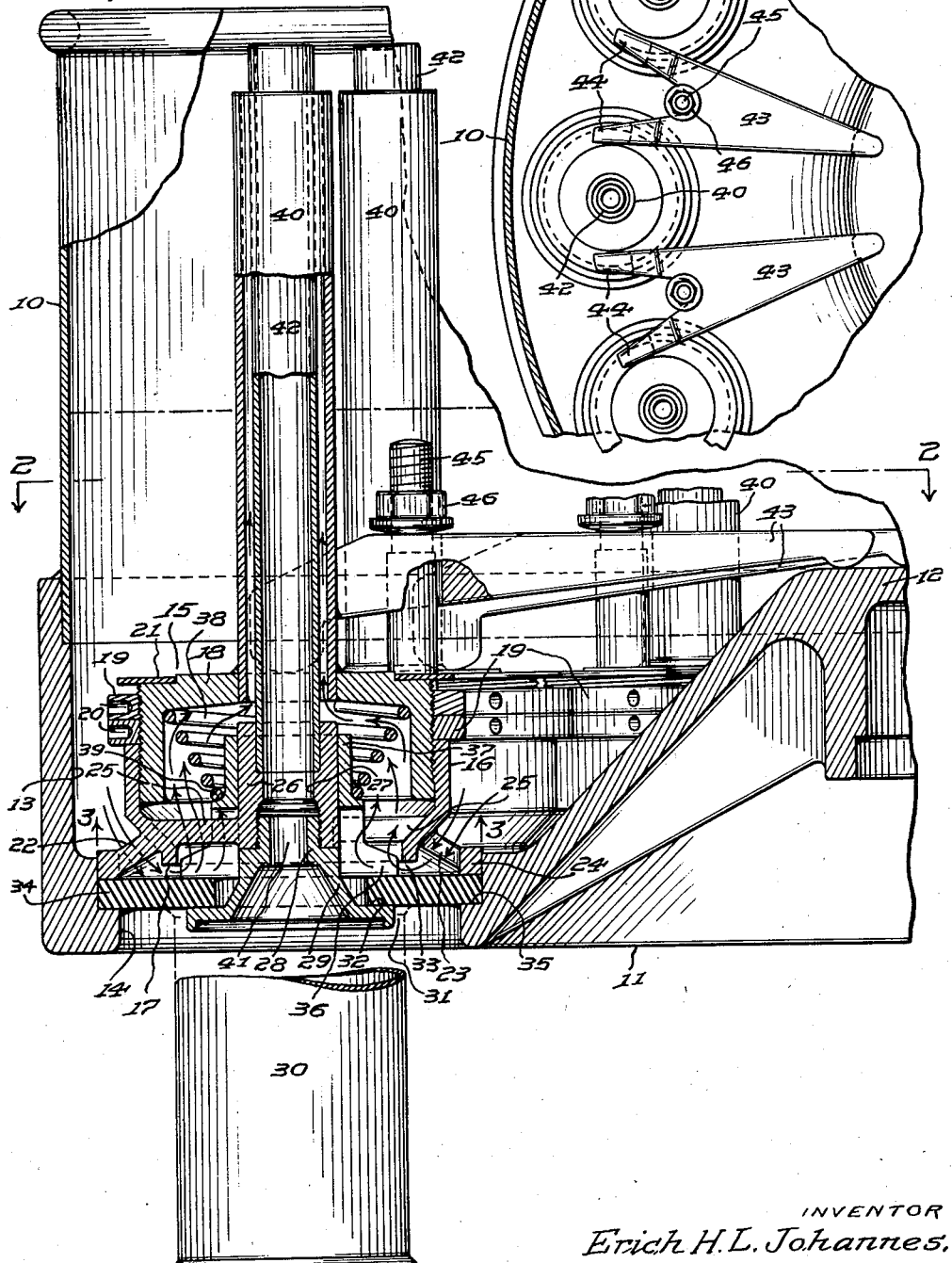
Fig. 1 is a vertical sectional view showing my improved measuring valve units in position in a filling tank, one of the movable valve elements being shown in its normal position to permit the liquid to flow from the filling tank into the measuring chamber and to prevent the discharge of the contents of the measuring chamber into the can.
Fig. 2 is a diagrammatic sectional view taken on the line 2—2 of Fig. 1, and showing a portion of a filling tank with my improved measuring valves assembled therein.

While my improved measuring valve may be utilized in other ways, I have disclosed the same herein in connection with the syrup tank 10 of a type of can filling machine which is well understood by those familiar with the art. The tank 10 is provided with a bottom wall 11 having a raised central portion 12 upon which the tank is supported for rotational movement. The bottom wall slopes outwardly and downwardly to provide a channel 13 around its outer edge into which the contents of the tank gravitate during the can filling operation. This channel is provided with a circular series of discharge openings 14, and one of my improved measuring valves is associated with each discharge opening in the manner illustrated diagrammatically in Fig. 2 of the drawings. Such filling tank and the associated filling valves, together with the can conveying mechanism and suitable operating mechanism, constitute apparatus of the type commonly referred to as a syruping machine.

As illustrated in the drawings, my improved measuring valve comprises a measuring chamber 15 which is preferably in the form of an inverted cup substantially cylindrical in shape and having a side wall 16 which may taper inwardly at the open end of the chamber where it terminates in an annular valve seat 17. The opposite end of the side wall 16 is threaded on the inside to receive the threaded end wall 18, the position of which is adjustable with respect to the side wall to vary the capacity of the chamber. The end wall 18 is retained in its various positions of adjustment by means of a pair of locking rings 19 threaded thereon and provided with suitable openings 20 for engagement by a spanner wrench to turn them into and out of engagement with the upper end of the side wall 16. A washer 21 may be shrunk on the end wall 18 outwardly of the locking rings 19 in order to prevent them from being backed off the end wall.

A web 22 provided with a plurality of perforations 23 projects outwardly from the tapered portion of the chamber wall 16 and terminates at its outer edge in a pedestal 24 which forms supporting means for the entire measuring valve unit upon the bottom wall of the filling tank. The pedestal 24 is of such a configuration as to support the unit centrally over one of the discharge openings 14.

A plurality of spider arms 25 extending inwardly from the tapered portion at the open end of the measuring chamber terminate in a hub 26 positioned centrally of the chamber and having an opening 27 extending longitudinally therethrough. The lower end of the opening 27 is threaded to receive a threaded nipple 28 on a filling head 29 which is positioned in the upper end of the can 30 in process of being filled. The outer edge of head 29 is spaced from the wall of the can, as shown at 31, to provide communication between the measuring chamber 15 and the interior of the can. The upper face of the edge of head 29 forms a valve seat 32 spaced outwardly from the valve seat 17 on the open end of the chamber to thus provide between these valve seats a port 33 communicating with the interior of the measuring chamber.

A movable valve element 34 in the form of a ring of rubber or other similar flexible or deformable material has its outer edge supported on the bottom wall of the filling tank, preferably on a shoulder 35 formed in the wall of the discharge opening 14, and is held in position thereon by means of the pedestal 24. The inner edge of the valve element 34 normally rests upon the valve seat 32. Movement of the inner edge of the valve element 34 away from the valve seat 32 is resisted by a plurality of feet 36 resting upon this inner edge and extending upwardly between the spider arms 25 where they terminate in a sleeve 37 which is slidably mounted upon the hub 26.

Figure 3:
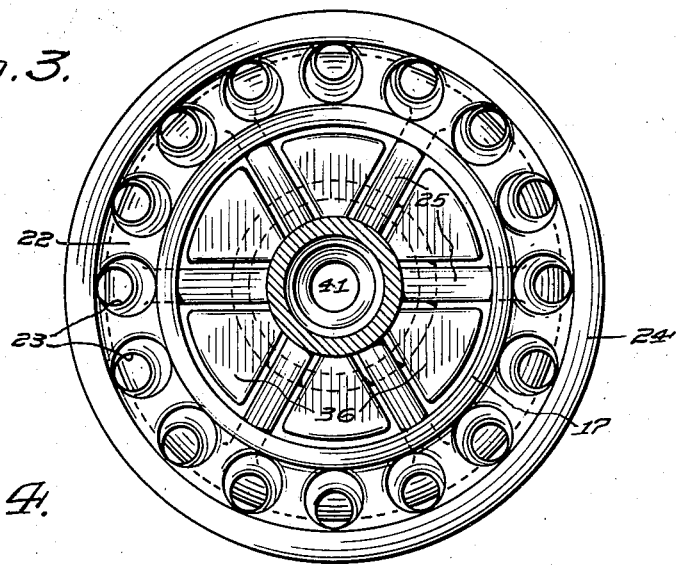
Fig. 3 is a transverse sectional view of a measuring valve taken on the line 3—3 of Fig. 1.

As will be apparent from the showing in Fig. 3, the feet 36 are of triangular shape and the outer ends thereof are spaced from the wall 16 around the open end of the measuring chamber, and the sides of the feet 36 are spaced from the spider arms 25, in order to permit the liquid to flow freely from the filling tank into the measuring chamber, and from the measuring chamber into the cans. Upward movement of the sleeve 37 on the hub 26 is resisted by a spirally coiled spring 38 having one end in engagement with a spring seat 39 on the lower end of the sleeve and having its opposite end in contact with the end wall 18 of the measuring chamber.

As will be clear from the structure shown by the drawings, the valve seat 32 is positioned substantially in the same plane as the shoulder 35 so that when the inner edge of the valve element 34 is in its normal position it rests upon the seat 32. The inner edge of the valve element 34 will therefore return to its normal position on the seat 32 when the can in process of being filled is lowered into the position shown in Fig. 1.

The valve return means disclosed herein has been designed for the purpose of providing a positive, quick return of the valve element 34 to the seat 32. It will be understood, however, that the positive return mechanism, including the sleeve 37, the feet 36 and the spring 38, may be omitted in some cases, as the valve element 34 normally tends to return into co-operative relation with the seat 32, and its return is aided by the weight of the liquid thereon. When so constructed, my improved measuring valve is further simplified in structure and operation, additional parts are thereby eliminated, and the movable metal-to-metal structure may be dispensed with entirely.

Positioned centrally of the end wall 18 of the measuring chamber and extending outwardly therefrom is a tube 40 which serves as an air vent for the measuring chamber. A central opening 41 through the head 29 and the nipple 28 communicates with the hub opening 27. A tube 42 secured in the upper end of the hub opening 27 and extending upwardly through the vent tube 40, and spaced from the wall thereof, serves as an air vent for the cans in process of being filled.

The measuring valve units are held in position over the discharge openings 14 by means of retainer arms 43 which have their inner ends resting upon the raised central portion 12 of the tank and have their outer ends forked to provide two spaced fingers 44 engaging with the end walls 18 of two adjacent measuring chambers. A retainer rod 45 secured to the bottom of the filling tank extends upwardly between adjacent measuring valve units. The upper end of each of these rods extends through the forked end of a retainer arm 43 and has a nut 46 in threaded engagement therewith for forcing the fingers 44 downwardly against the measuring chambers to thereby compress the outer edges of the annular valve elements 34 between the pedestals 24 and the shoulders 35 and retain the valve units in position. With such retaining means, any measuring valve unit may be easily and quickly removed from the filling tank by merely loosening the nuts 46 to thereby permit the two adjacent arms 43 to be disengaged from the measuring chamber, whereupon the unit is free to be lifted out of its position.

The operation of my improved measuring valve will be clear to those who are familiar with apparatus of this general type. The complete assembly of the can filling machine involves mechanism for rotating the filling tank, and a conveyor for transporting cans into such positions beneath the tank that the open ends thereof aline successively with the discharge openings in the tank and the open ends of the measuring chambers, it being understood that the solid ingredients of the material to be canned have theretofore been placed in the cans at another filling station or stations. During the process of completing the fill of the cans by the syrup or other liquid in the filling tank, the cans are transported with the tank through a part of its rotational movement. The depth of the liquid in tank 10 should be such as to extend above the end walls 18 of the measuring chambers at all times, although it is not necessary, with the present filling valve, that a uniform level of liquid be maintained in the tank.

As shown in Fig. 1 of the drawings, the open can 30 has been raised into a position where its upper end is in contact with the valve element 34. In this position of valve 34 it will be apparent that the liquid in the filling tank is free to flow through the openings 23 of the web 22, between the valve seat 17 and the valve 34, thence upwardly around the feet 36 into the measuring chamber. This flow of the liquid is indicated by the arrows shown in Fig. 1 of the drawings. It will also be noted that, during this period of the filling cycle, the inner edge of valve 34 is in contact with valve seat 32 to thereby prevent the passage of any liquid into can 30.

Figure 4:
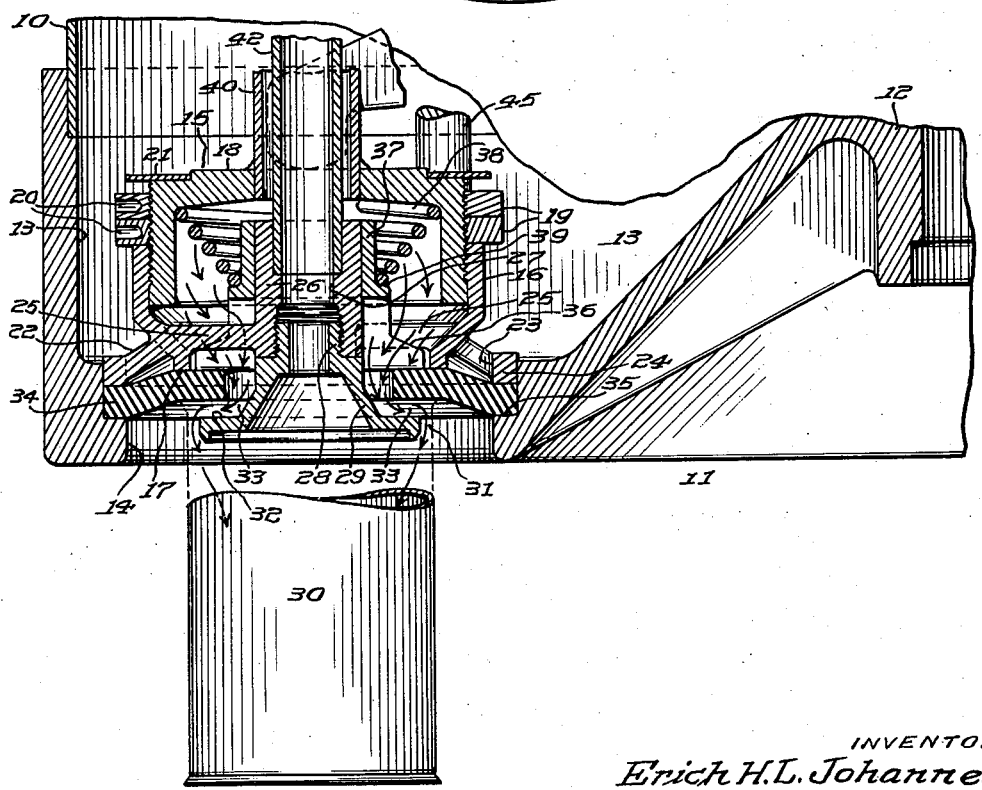
Fig. 4 is a view generally similar to Fig. 1, but showing the movable valve element positioned by the can to cut off communication between the filling tank and the measuring chamber and to permit the discharge of the contents of the measuring chamber into the can.

As the tank and the particular can shown in the drawings rotate about the center of the tank, the can is raised further by means of any suitable lifting mechanism into the position shown in Fig. 4 of the drawings. In this position of the can the inner edge of the valve 34 has been lifted from the valve seat 32 into contact with the valve seat 17, to thereby cut off the flow of liquid from the filling tank into the measuring chamber and permit the contents of the measuring chamber, or the major portion thereof, to flow over the valve seat 32 and through the annular space 31 into the can. That portion of the contents of the measuring chamber not utilized for filling the can then in position beneath the valve unit remains in the chamber and becomes a part of the contents of the chamber for use in filling the next can positioned beneath that particular valve unit. The can is subsequently lowered out of engagement with valve 34, while still moving with the tank, and the valve is moved downwardly out of contact with seat 17 into contact with seat 32 to close the passageway to the can and to permit the chamber to be filled from the tank, as shown in Fig. 1 of the drawings.

From the above description of the structure and operation of my improved filling valve, it will be clearly apparent that there are no movable metal-to-metal surfaces in the valve proper. The flow of liquid from the filling tank into the measuring chamber is controlled by the flexible valve element 34, and this element likewise controls the discharge of the liquid from the measuring chamber into the cans. A valve of this character provides a structure which is not only simple in operation but does not become fouled easily or quickly when it is in use. The flexible valve element as well as all other parts of the device may be readily removed for repair, or for cleaning after the completion of a given run, and in view of the simplicity of the device the cleaning operation is a comparatively easy one. The movable valve element being the only part which is subject to any material wear, the cost of replacement of parts of the device is reduced to a minimum by reason of the inexpensive character of this valve element.

The filling valve disclosed herein has been designed with the particular object in view of delivering a variable, measured quantity of liquid to the cans after certain other ingredients, usually of a solid or semi-solid character, have been placed in the cans. It is desired to emphasize, however, that the improvement is readily adaptable for use with various sizes of cans and in filling cans with different materials. In filling cans with a particular material, the wall 18 of the measuring chamber is adjusted so that the capacity of the chamber is such as to provide the maximum quantity of liquid desired to fill the cans to the desired level after the solid ingredients have been placed therein, it being understood that the desired level of the contents of each can will be produced when the can has been lowered away from the head 29 after completion of the filling operation.

As will be apparent from the above description, and from the showing in the drawings, the measuring chamber is designed to add only sufficient liquid contents to the can to fill it to the desired level after the solid ingredients have been placed therein, and when used in this manner its maximum capacity is substantially less than the total capacity of the can. At no time therefore will the can be completely filled in case one or more of the ingredients, which should have been placed in the can at a prior filling station or stations, have been accidentally omitted. A filling valve of this type is therefore particularly useful in enabling the operator of the filling machine to detect the absence of one or more of the solid ingredients from the can after the completion of the filling operation.

In addition to the above, it will also be apparent that the present improvement provides a differential filling valve having a structure such that the syrup or other liquid is introduced into each can in sufficient quantity to complete the fill without wasting any of the liquid by overflowing the cans, as occurs with the use of many of the known filling machines. As heretofore pointed out, when the can 30 and the movable valve element 34 are in the position shown in Fig. 4 of the drawings, the liquid contents of the filling chamber are free to flow from the chamber into the can while communication between the chamber and the tank is cut off by reason of the contact of valve element 34 with valve seat 17. When the can is subsequently lowered away from the filling valve unit, valve element 34 moves out of contact with valve seat 17, and into contact with valve seat 32 to cut off communication between the chamber and the can. As will be clear from the showing in Figs. 1 and 4 of the drawings, the upper edge of the can 30 is in contact with the valve element 34 during the entire filling operation, and when the can is lowered from the position shown in Fig. 4 to the position shown in Fig. 1, no liquid can overflow the edge of the can and any excess of liquid over that required to complete the fill of a particular can remains in the filling chamber, and no liquid is wasted by overflowing the can as would result if the entire contents of the measuring chamber were discharged into a can having a slight excess of solid ingredients therein.

When a filling machine without the above feature is employed, as is now the common practice, there is no practical way by which the operator may detect the absence of the omitted ingredients, with the result that many of the filled cans do not have the necessary ingredients therein. For example, a can of pork and beans without any beans, or without any pork, or without both, is a source of numerous complaints from the users of such products. With a filling valve such as I have disclosed herein, the quantity of liquid placed in each can is never sufficient to fill the can when any of the other ingredients have been omitted. Therefore the level of the ingredients in the can after the syruping operation will indicate to the operator whether or not any ingredients have been omitted at prior filling stations, and enable him to reject immediately such cans as do not have the necessary ingredients therein. These features of my improvement serve to distinguish it from prior filling apparatus so designed as to overflow the can at all times, or to fill the can completely with liquid notwithstanding the absence therefrom of one or more ingredients accidentally omitted at a prior station or stations.

While certain structural forms of my invention have been disclosed herein, together with the preferred arrangement of the various parts with respect to one another, it is to be understood that the invention is not intended to be limited to the precise structure and arrangement of parts as shown and described. The above description and the accompanying drawings are therefore to be regarded as illustrative only of the form and arrangement of the various elements of the apparatus, and it is to be understood that the invention is susceptible of other forms and arrangements so long as they come within the scope of the appended claims.

What I desire to claim is:

1. In a can filling machine, the combination of a tank having a discharge opening therein, a measuring chamber supported over said opening and having a port therein arranged to admit liquid from said tank and discharge the same into the can, an inlet valve seat on said chamber, an outlet valve seat on said chamber and spaced from said inlet valve seat, and a flexible valve member normally co-operating with said outlet valve seat to prevent the discharge of liquid into the can and flexibly movable by the can into co-operation with said inlet valve seat to prevent the passage of liquid from said tank into said chamber.

2. In a can filling machine, the combination of a tank having a discharge opening therein, a measuring chamber supported over said opening and having a port therein arranged to admit liquid from said tank and discharge the same into the can, an inlet valve seat on said chamber, an outlet valve seat on said chamber and spaced from said inlet valve seat, a ring-shaped flexible valve having one edge fixed and its other edge movable between said valve seats, and resilient means for resisting the movement of the movable edge of said valve by the can.

3. In a can filling machine, the combination of a tank having a discharge opening therein, a measuring chamber supported over said opening and having a port therein arranged to admit liquid from said tank and discharge the same into the can, an inlet valve seat on said chamber, an outlet valve seat on said chamber and spaced from said inlet valve seat, a ring-shaped flexible valve having its outer edge fixed and its inner edge movable between said valve seats, and resilient means for normally retaining the inner edge of said valve on said outlet valve seat.

4. In a can filling machine, the combination of a tank having a discharge opening therein, a measuring chamber supported over said opening and having a port therein arranged to admit liquid from said tank and discharge the same into the can, an inlet valve seat on said chamber, an outlet valve seat on said chamber and spaced from said inlet valve seat, a ring-shaped flexible valve having its outer edge secured to said tank and its inner edge normally resting on said outlet valve seat and movable by the can into contact with said inlet valve seat.

5. In a can filling machine, a tank having a discharge opening therein, a cup-shaped measuring chamber inverted over said opening with its open end in alinement therewith, an inlet valve seat on the open end of said chamber, an outlet valve seat supported by said chamber outwardly of said inlet valve seat, and a flexible valve member normally co-operating with said outlet valve seat to close said discharge opening and flexibly movable by the can into co-operation with said inlet valve seat and to open said discharge opening.

6. In a can filling machine, a tank having a discharge opening therein, a cup-shaped measuring chamber inverted over said opening with its open end in alinement therewith, an inlet valve seat on the open end of said chamber, a filling head supported concentrically of said opening and having an outlet valve seat formed thereon outwardly of and opposing said inlet valve seat, and a ring-shaped flexible valve having its outer edge secured to the wall of said opening and its inner edge normally resting on said outlet valve seat and movable by the can into contact with said inlet valve seat.

7. In a can filling machine, a tank having a discharge opening therein, a cup-shaped measuring chamber inverted over said opening with its open end in alinement therewith, an inlet valve seat on the open end of said chamber, an outlet valve seat supported by said chamber outwardly of said inlet valve seat, a ring-shaped flexible valve having its outer edge supported on the wall of said opening and its inner edge normally in contact with said outlet valve seat and movable by the can into contact with said inlet valve seat, a pedestal on said chamber for supporting the latter on the outer edge of said valve, and means interengaging said tank and said chamber for clamping the outer edge of said valve between said pedestal and said wall and retaining said chamber in position.

8. In a can filling machine, a tank having a discharge opening in the bottom thereof, a valve seat supported centrally of said opening, a ring-shaped flexible valve having its outer edge supported on the wall of said opening and its inner edge normally resting on said valve seat, spring means for holding the inner edge of said valve on said valve seat, a housing for said spring means, a pedestal on said housing for supporting the same on the outer edge of said valve, and a retainer arm in engagement with said tank and said housing for clamping the outer edge of said valve between said pedestal and said wall and holding said housing in position.

9. In a measuring valve for a can filling machine, a cup-shaped chamber having a valve seat on the open end thereof, a valve seat positioned outwardly of the open end of said chamber and providing a port communicating with said chamber between said valve seats, and a diphragm valve having its outer edge fixed with respect to said chamber and having an opening therethrough to provide an edge portion movable between said valve seats.

10. In can filling apparatus, a measuring device comprising a cup-shaped chamber having a valve seat on the open end thereof, a plurality of spider arms extending inwardly from the open end of said chamber, a hub supported within said chamber by said arms, a valve seat supported by said hub outwardly of said chamber, a perforated web extending outwardly from the open end of said chamber and having supporting means on the outer edge thereof, a flexible ring-shaped valve having its outer edge in engagement with said supporting means and its inner edge normally in contact with the valve seat on said hub, a sleeve slidably mounted on said hub within said chamber, a plurality of feet extending from said sleeve between said arms for engagement with the inner edge of said valve, and a spring within said chamber and in engagement with said sleeve to normally hold the inner edge of said valve on the valve seat on said hub.

11. In can filling apparatus, a substantially cylindrical measuring chamber having one end open and an end wall threaded in the opposite end and adjustable therein to vary the capacity of the chamber, means for locking the end wall in various positions of adjustment, a perforated web extending laterally from the open end of said chamber, and means on the outer edge of said web, in a plane outwardly of said open end, forming a support for said chamber in inverted position.

12. In a can filling machine, a tank having a discharge opening in the bottom wall thereof, a filling valve associated with said opening and including a housing having a pedestal thereon for supporting said housing on said wall, a retainer rod projecting upwardly from said wall adjacent said opening, a retainer arm having one end in engagement with said bottom wall and the opposite end in engagement with said housing, and a nut threaded on said rod in engagement with said arm for holding said housing in position.

ERICH H. L. JOHANNES.